United States Patent

Noble

[15] 3,652,162

[45] Mar. 28, 1972

[54] COMPLEX DATA PROCESSING SYSTEM EMPLOYING INCOHERENT OPTICS

[72] Inventor: Milton L. Noble, Liverpool, N.Y.

[73] Assignee: General Electric Company

[22] Filed: Mar. 14, 1968

[21] Appl. No.: 712,991

[52] U.S. Cl. ....................356/71, 350/3.5, 350/162, 235/181, 340/173, 250/219

[51] Int. Cl. ....................G06k 9/08, G02B 5/18

[58] Field of Search ....................356/71; 350/3.5, 162; 235/181; 340/173; 250/219

[56] References Cited

UNITED STATES PATENTS

| | | | |
|---|---|---|---|
| 3,240,108 | 3/1966 | Lehan et al. | 350/162 X |
| 3,312,955 | 4/1967 | Lamberts | 340/173 |
| 3,492,635 | 1/1970 | Farr | 350/162 X |
| 3,064,519 | 11/1962 | Shelton, Jr. | 356/71 |
| 3,124,636 | 3/1964 | Fitzmaurice | 356/71 X |
| 3,305,834 | 2/1967 | Cooper et al. | 340/146.3 |
| 3,436,216 | 4/1969 | Urbach | 350/162 X |

OTHER PUBLICATIONS

Cutrona, " The Use of Lasers in Signal Processing for Radar and Communications," in Proceedings of the Eighth Annual Electron and Laser Beam Symposium, held Apr. 6- 8, 1966, pub. date Dec. 1, 1966, pp. 39- 43, 47, 51- 61, 64- 83.

Cutrona et al. " Optical Data Processing & Filtering Systems," Iretrans. On Information Theory, June 1960, p. 386- 400

Cooper, " Some Methods of Signal Processing Using Optical Techniques," Radio & Electronic Engr. July 1963, pp. 5-13

King et al., " Real-Time Electrooptical Signal Processors with Coherent Detection," Applied Optics, 6(8), Aug. 67 pp. 1367-1374 Armitage et al., "Character Recognition by Incoherent Spatial Filtering," Applied Optics Apr. 4(4), 1965 pp. 461-467

*Primary Examiner*—Ronald L. Wibert
*Assistant Examiner*—R. J. Webster
*Attorney*—Marvin A. Goldenberg, Richard V. Lang, Frank L. Neuhauser, Oscar B. Waddell and Melvin M. Goldenberg

[57] ABSTRACT

An optical system for processing analog information in the form of complex data without a requirement for coherent optics, wherein discrete pieces of data having magnitude and phase components are multiplied together in a parallel operation. Information to be processed is entered in the form of diffraction gratings upon a pair of spaced apart writing media, normally in a column-row arrangement of distinct resolution elements. Magnitude information is contained in the transmissivity of the resolution elements and phase information in the spatial frequency of the gratings. Processing of resolution element pairs is optically performed by imaging spatially filtered light from resolution elements of the first medium upon corresponding elements of the second medium by means of a telecentric lens arrangement, spatially filtered light from the second medium being detected to provide the processed information.

17 Claims, 16 Drawing Figures

INVENTOR:
MILTON L. NOBLE,
BY Marvin L. Lilienkey [signature]
HIS ATTORNEY.

INVENTOR:
MILTON L. NOBLE,

BY Marvin L. Edelberg
HIS ATTORNEY.

INVENTOR:
MILTON L. NOBLE,

BY [signature]

HIS ATTORNEY.

INVENTOR:
MILTON L. NOBLE,
BY Marvin L. Zeldenberg
HIS ATTORNEY.

COMPLEX DATA PROCESSING SYSTEM EMPLOYING INCOHERENT OPTICS

BACKGROUND OF THE INVENTION:

1. Field of the Invention

The invention relates generally to the field of analog information processors and more particularly to optical systems which perform complex and coherent data processing. As employed herein complex data refers to data having both magnitude and phase components which may extend over a continuous range of values. Coherent data normally refers to whole numbers having a positive or negative designation, being a special case of complex data in which the phase component is limited to one of two finite values.

2. Description of the Prior Art:

Optical information processors offer a number of advantages over electronic and mechanical systems, the most outstanding of which is the ability to process large quantities of information in a direct and efficient manner. Relatively simple and inexpensive optical components can be employed for processing incoherent information, i.e., where the processed data has no sign or phase component. Presently developed optical systems do not, however, have a ready capability for processing a general form of complex data. Moreover, for processing coherent data a critically coherent optical system is required. In coherent optical systems sign information is encoded as the relative phase of light. This requires a highly collimated source and carefully controlled tolerances on each optical surface of the system to avoid the introduction of arbitrary phase fronts in the output. As a further limitation, most real-time wideband writing media are not compatible with coherent systems.

BRIEF SUMMARY OF THE INVENTION

Accordingly, it is a primary object of the invention to provide a novel optical information processing system for providing a direct and convenient processing of complex data.

It is a further object of the invention to provide a novel optical information processing system as above described that is of a relatively simple configuration, requiring neither a coherent light source nor strict tolerances on the system's optical surfaces.

Another object of the invention is to provide a novel optical information processing system for multiplying together positive and negative numbers with the use of relatively simple and inexpensive optical components.

Another object of the invention is to provide a novel optical processing system as above described for multiplying together complex numbers having a continuous range of phase component values.

A further object of the invention is to provide a novel optical information processing system as above described wherein numerous inputs are processed simultaneously and discrete outputs generated.

Another object of the invention is to provide a novel optical information processing system as above described wherein integrated products can be obtained directly from the output optical energy.

A further object of the invention is to provide a novel optical information processing system for processing complex data with which most real-time wideband writing media are compatible.

These and additional objects of the invention are accomplished by an optical information processing system which in its basic arrangement includes first and second spaced apart light modulating writing media upon which data is entered in the form of several diffraction grating lines per resolution element. Magnitude information is contained in the transmissivity of the resolution elements and phase information in the spatial frequency of the grating lines. A source of light is projected through the resolution elements of said first medium so as to be modulated thereby. A first spatial filtering means passes selected components of the modulated light with a magnitude and direction that is a function of the data applied to said first writing medium. A telecentric lens arrangement images the selected light components upon corresponding resolution elements of the second writing medium which further modulate the light. A second spatial filtering means passes selected components of the twice modulated light with a magnitude and direction that is a function of the product of the data applied to said first and second writing media. Photosensitive means are provided for detecting the processed light.

In accordance with one aspect of the invention complex data is processed wherein the phase information is written as one of numerous spatial frequencies.

In accordance with a second aspect of the invention, positive and negative whole numbers are processed wherein the sign information is written as one of two distinct spatial frequencies.

In accordance with another aspect of the invention, discrete product outputs may be obtained by imaging the spatially filtered light from said second writing medium upon an output image plane, providing means for selectively passing the light incident upon each output resolution element and employing a further spatial filter for passing selected light components for each output resolution element.

In accordance with still another aspect of the invention, integrated product outputs may be obtained directly from the light passed by said second spatial filtering means.

BRIEF DESCRIPTION OF THE DRAWING:

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

Figures 1, 3, 4:
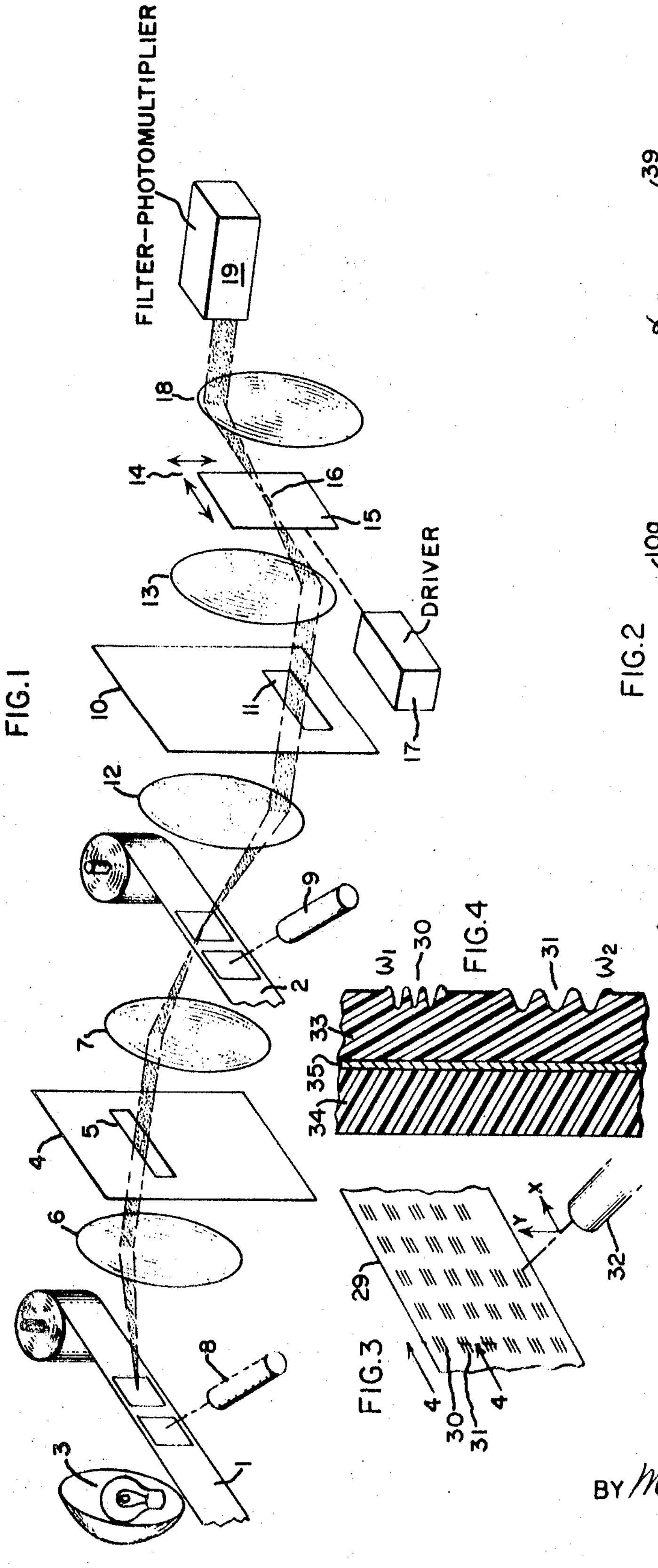
FIG. 1 is a perspective view of an optical information processing system which, in accordance with a general form of the invention, provides a processing of complex data.
FIG. 3 is an enlarged view of a portion of the writing medium of FIG. 1 in which are written several diffraction grating lines per resolution element.
FIG. 4 is a cross sectional view of the medium of FIG. 3 taken along the plane 4—4.

DESCRIPTION OF THE PREFERRED EMBODIMENTS:

In FIG. 1 there is illustrated in perspective view a generic form of an optical information processing system which provides, in accordance with the invention, a processing of complex data, viz., data having both magnitude and phase components. Basically, there is performed a parallel multiplication operation wherein a multiplicity of data inputs entered upon a first light modulating writing medium 1 are, by optical means, multiplied with a corresponding multiplicity of data inputs entered upon a second light modulating writing medium 2. Mathematically, the processed data inputs may be each expressed as a vector quantity in the simplified exponential form $Ae^{i\phi}$, where A is the magnitude of the data and $e^{i\phi}$ its angle or phase. Further, the processing of a pair of data inputs may be expressed by the following equation:

$$[A_1e^{i\phi_1}][A_2e^{i\phi_2}]=[A_1A_2][e^{i(\phi_1+\phi_2)}] \qquad (1)$$

The processed data is said to be coherent where the phase component of each data input is limited to one of two finite values.

Referring specifically to the structure of FIG. 1, light from a source of relatively non-coherent optical energy, schematically illustrated by lamp 3, is directed along the optic axis through a confined area of the first writing medium 1 to which a first set of data inputs has been applied. A first spatial filter 4 having a narrow aperture 5 passes only selected information bearing light components of the light transmitted from writing medium 1. The light passed by aperture 5 is modulated in both amplitude, or intensity, and phase. The phase information is included in the angle from the optic axis along which the modulated light is directed. The modulated light is imaged by lens elements 6 and 7 upon a confined area of the second writing medium 2 to which a corresponding second set of data inputs has been applied.

In the embodiment being considered the writing media 1 and 2 are in the form of thermoplastic tape. The data is entered by the deposition of electrical charge, schematically illustrated as provided by electron gun means 8 and 9, which writing process will be considered in greater detail subsequently.

Light directed to the writing medium 2 is further modulated thereby. A second spatial filter 10 having a narrow aperture 11 passes selected information bearing light components of the light from medium 2. Accordingly, light transmitted through aperture 11 has an intensity and direction that is proportional to the magnitude and phase of the product of the applied data. Lens elements 12 and 13 image the light from writing medium 2 upon an output image plane 14. A sampling spatial filter 15 having an aperture 16 may be scanned in the output image plane 14 for passing light energy representing discrete products of the processed data. A mechanical driver mechanism, schematically illustrated at 17, may provide the scanning function. A further lens element 18 projects the light from output image plane 14 to an output spatial filter and photodetector component 19, generally illustrated in block form, where the light energy of discrete products represented by separate light components may be detected.

Figure 2:
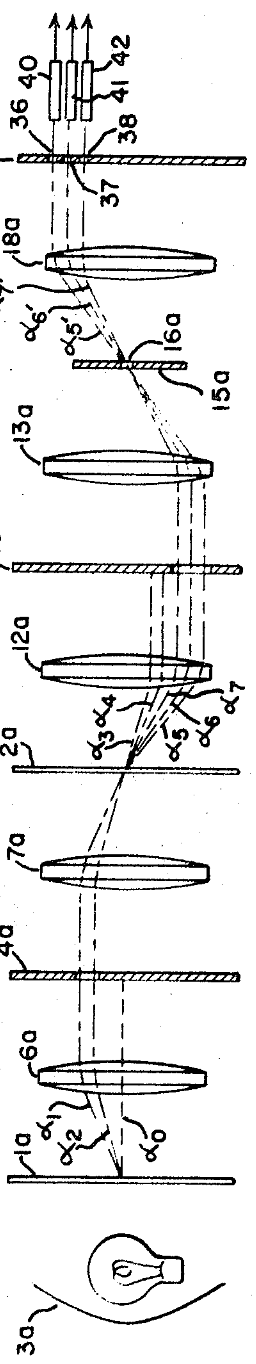
FIG. 2 is an optical schematic diagram, in side view, of a first specific embodiment of the invention in which coherent data is processed to provide discrete product outputs.

In FIG. 2 there is presented an optical schematic diagram, corresponding to a side view of the structure of FIG. 1, of a first specific embodiment of the invention. The illustrated system performs a coherent processing of data wherein positive and negative numbers may be multiplied together and their individual products provided at the output. Optical components corresponding to those of FIG. 1 are assigned the same reference number but with an added *a* subscript. Data is entered upon the writing media 1*a* and 2*a* normally in a formation of rows and columns of resolvable elements. Each resolvable element includes several diffraction grating lines. Amplitude information is applied by controlling the light transmissivity of each element either through density modulation or diffraction techniques. Sign information is applied by assigning to the grating lines a spatial frequency equal to one of two finite values $\omega_1$ and $\omega_2$, where $\omega_1$ may denote positive numbers and $\omega_2$ negative numbers.

A number of different transmissive writing media and writing techniques may be employed, including deformable writing media as well as density modulated media. For example, photographic film can be used as the writing media, having information impressed thereon by common photographic means, or by an electron beam writing technique. An oil film having charge applied thereto by electron beam writing or through an in-air recording process may also be employed. In the embodiment under consideration, a thermoplastic film was used and the grating lines impressed by an electron gun.

In FIG. 3 is shown in enlarged scale a thermoplastic film strip 29 having a number of resolution elements, of which only elements 30 and 31 are numbered, written upon by an electron gun 32. A demountable vacuum system may be used, which systems are known and need not be further considered here. The film 29 may be of well known construction, having a thermoplastic layer 33, a plastic base layer 34 and an intermediate transparent conductive coating 35, as shown in the cross sectional view of FIG. 4 taken along the plane 4—4. Information is written by scanning the beam from gun 32 over the film using one of several conventional techniques to deposit charge in a parallel line pattern. For example, a single frame, constituting one column or a succession of several columns of data, may be written by scanning the beam in both the X and Y directions while the film is held stationary. In this mode of operation, the beam current may be intensity modulated as the beam is scanned in the X direction to vary the deposited charge and thereby provide the amplitude information. The spacing of the line patterns is controlled by the Y scan. The film may be stepped in the X direction by mechanical transport means, not shown, for writing successive frames. In another writing mode the film may be continuously moved in the X direction, providing a slow scan component in this direction.

Heating of the thermoplastic film causes the deposited charge to deform the film surface along the grating lines, as shown in FIG. 4. The depth of the grooves provides amplitude information of the written data and the line spatial frequency provides sign information. In FIG. 4, element 31 has a spatial frequency of $\omega_1$ and element 32 a spatial frequency of $\omega_2$, where, arbitrarily, $\omega_1>\omega_2$. In accordance with well understood principles of thermoplastic recording, light projected through each resolution element is, through diffraction, provided with an intensity that is in accordance with the groove depth. More precisely, the amount of light channeled into the transmitted higher orders of the diffraction pattern is a function of the depth of the grooves. Further, the direction of the diffracted light is a function of the spatial frequency. Accordingly, for $\omega_1>\omega_2$, light diffracted by element 30 will be directed at a greater mean angle with respect to on axis light than will light diffracted by element 31.

Referring once more to FIG. 2, there is illustrated the light transmitted through a single resolution element of writing medium 1*a* and a corresponding resolution element of medium 2*a*. This light includes only zero and positive first order components of the diffraction pattern. It may be appreciated that light energy is contained in higher positive orders as well as in the negative orders. However, only the diffraction orders shown are utilized in the embodiment under consideration. Further, only the light components applicable to the processing of a single pair of resolution elements are referred to in order to simplify the explanation. However, it should be understood that a parallel processing operation is herein performed where light components similar to those illustrated and described are applicable to each resolution element of the writing media 1*a* and 2*a*.

As shown in FIG. 2, zero order light corresponding to zero input applied to the resolution element of medium 1a is directed along the path $\alpha_o$, which is the projection axis. First order light corresponding to a given applied input is directed along one of two paths, $\alpha_1$ and $\alpha_2$, where $\alpha_1$ corresponds to an input of $\omega_1$ and $\alpha_2$ corresponds to an input of $\alpha_2$. The light is imaged by lens elements 6a and 7a onto a corresponding resolution element of writing medium 2a. The spatial filter 4a passes the positive first order components and blocks all other orders.

Lens elements 6a and 7a form a telecentric lens arrangement of unity magnification, providing an accurate one to one correlation between the resolution elements of writing media 1a and 2a. They have the same focal length and are each spaced by their focal length from the writing media 1a and 2a, respectively, and from the spatial filter 4a, providing a completely symmetrical arrangement in accordance with the requirements of a telecentric lens system. A telecentric lens system offers several advantages, among which are a uniform illumination of the image plane and a well defined spatial frequency plane, in which the diffraction pattern is formed. The filter 4a is positioned in said spatial frequency plane.

Light is incident upon the corresponding resolution element of writing medium 2a at an angle and intensity that is a function of the information supplied to the single resolution element of writing medium 1a. The light is further modulated in intensity and angle by the information supplied to the resolution element of medium 2a so that in effect, the transmissivities of corresponding resolution elements multiply and angles add. Accordingly, light transmitted from medium 2a and passed by filter 10a located in the spatial frequency plane between lens elements 12a and 13a has an intensity proportional to the magnitude of the product of the two inputs, and is directed along a path that is a function of the sign of the product.

In the more physical sense, components of light transmitted from medium 2a are shifted in direction by an amount equal to the angle at which light is incident upon said medium. Accordingly, the zero order light components are directed along either of paths $\alpha_3$ or $\alpha_4$. The positive first order light components are directed along one of the following three paths $\alpha_5$, $\alpha_6$ or $\alpha_7$. The light along paths $\alpha_3$ and $\alpha_4$ is provided by tangible inputs to writing medium 1a and a zero input to writing medium 2a, and therefore represents zero product outputs. This light is stopped by filter 10a. It may be appreciated that for zero products resulting from a zero input at writing medium 1a, as well as at both the writing media, no light is transmitted beyond filter 4a. The light along path $\alpha_5$ is provided by inputs of $\omega_1$ at both resolution elements of the pair under consideration. Since $\omega_1$ and $\omega_2$ have been arbitrarily assigned positive and negative designations, respectively, this light represents products of positive sign. Light along path $\alpha_6$ is provided by inputs of $\omega_1$ and $\omega_2$, without regard to the order of application at the resolution elements, representing products of negative sign. Light along path $\alpha_7$ is provided by inputs of $\omega_2$ at both resolution elements, representing product outputs of positive sign. The positive first order light components along paths $\alpha_5$, $\alpha_6$ and $\alpha_7$ are passed by spatial filter 10a, all other light components being stopped.

Since numerous resolution element pairs are in fact being simultaneously processed, the bundles of light passed by filter 10a contain integrated product information of numerous inputs rather than discrete product information. To obtain product data of discrete pairs of resolution elements, the telecentric lens arrangement of elements 12a and 13a, possessing the same constraints as previously noted with respect to lens elements 6a and 7a, image the spatially filtered light from writing medium 2a to the output image plane and sampling spatial filter 15a. It may be appreciated that the light imaged to output resolution element areas in the output image plane contains intensity information but no phase information since the previously separate light components representing different phase information are converged at each of the output resolution elements. The sampling filter 15a scans the output image plane and successively passes through its aperture 16a the light of individual resolution elements. Upon passing through aperture 16a, the light again diverges and is directed along three separate paths $\alpha'_5$, $\alpha'_6$ and $\alpha'_7$, which correspond to paths $\alpha_5$, $\alpha_6$ and $\alpha_7$, respectively. It may be appreciated, however, that paths $\alpha'_5$, $\alpha'_6$ and $\alpha'_7$ contain energy of discrete output products. A lens element 18a, telecentrically arranged with respect to lens 13a, projects the diffracted light in a parallel direction where it is passed by three separate apertures 36, 37 and 38 of an output sampling filter 39, located in the spatial frequency plane of lens 18a. Three photomultiplier components 40, 41 and 42 detect the light passed by filter 39 and transform the information into electrical output signals. Photomultiplier 40 and 42 supply product outputs of positive sign and photomultiplier 41 supply product outputs of negative sign.

It may be appreciated that the light source 3a need not project highly coherent light energy nor do the lens elements require coherent properties. It is necessary only that the source and lens elements be of adequate quality to permit spatial separation of energy in the first order light components corresponding to the different spatial frequencies so that said components are separately detectable.

In one operable embodiment of the invention shown in FIG. 2, a 375 watt G.E. Quartzline lamp was used as the source of light together with a simple condensing system, and a 6 inch F/28 Super-Baltar lens for each of the lens elements. A 35 mm. thermoplastic tape was employed and an electron gun writing with a bandwidth on the order of 10 MHz. Typical resolutions are on the order of 200 resolution elements per column with five grating lines for each element frequencies and with line spatial frequencies of $\omega_1$=55 lines/mm. and $\omega_2$= 45 lines/mm.

Figure 5:
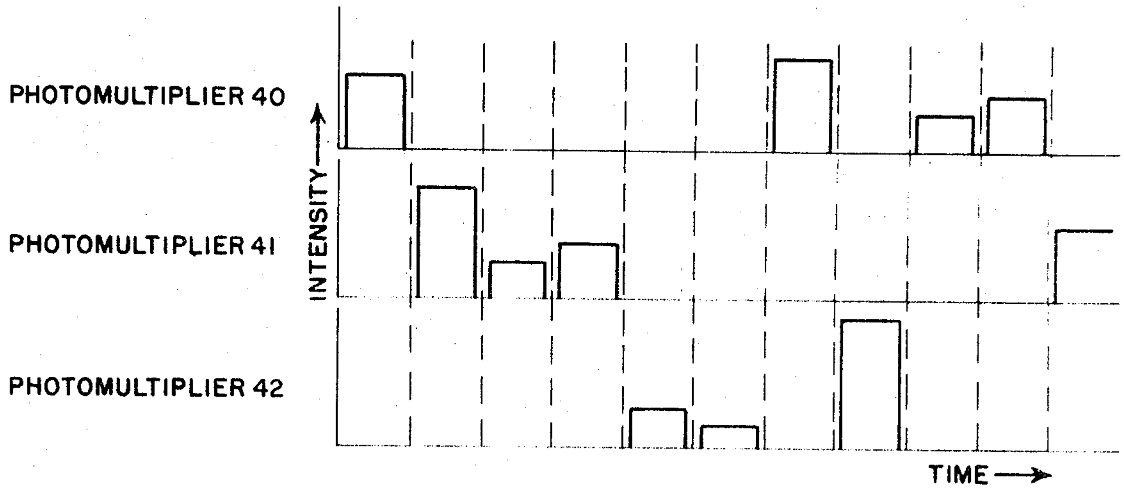
FIG. 5 is a series of graphs employed in the description of the embodiment of FIG. 2.

In FIG. 5 is a graph showing a sequence of outputs from the photomultiplier components 40, 41 and 42 during successive periods of time, each period corresponding to the scanning of an individual output resolution element by the sampling filter 15a. The outputs are series of electrical pulses of varying magnitudes which represent the absolute value of discrete products. The sign information is obtained from the photomultiplier supplying the output. As will be more clearly shown in subsequent embodiments, the electrical outputs can be operated upon in various ways to provide different forms of information in accordance with existing requirements.

Figure 6:
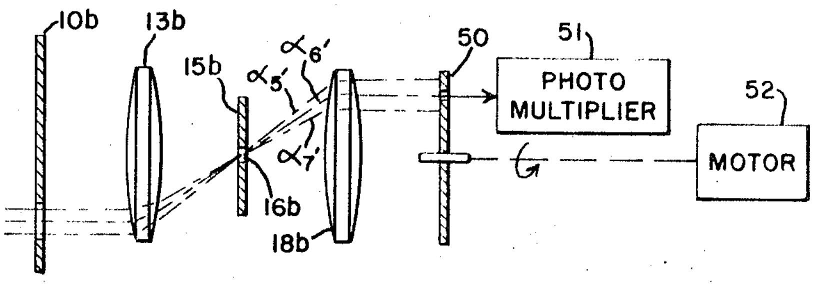
FIG. 6 is an optical schematic diagram of a second embodiment of the invention similar to that of FIG. 2, employing a rotating 15 sampling spatial filter at the output.
Figure 7:
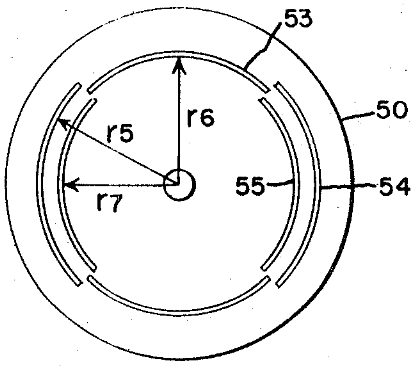
FIG. 7 is a front view of the sampling spatial filter of FIG. 6.

FIG. 6 is a modification of the embodiment of FIG. 2 wherein a rotating sampling spatial filter 50 and a single photomultiplier output component 51 are employed in lieu of sampling filter 39 and photomultipliers 40–42. Mechanical rotation of filter 50 is provided by motor 52. Components in FIG. 6 which correspond to components in FIG. 2 are similarly labeled but with a *b* subscript, these being components 10b, 13b, 15b and 18b. The three light components along paths $\alpha'_5$, $\alpha'_6$ and $\alpha'_7$ are sequentially passed by the filter 50 so that the positive and negative information light are alternately sampled. As illustrated by the front view of FIG. 7, sampling filter 50 includes a first pair of concentrically arranged opposing apertures 53, and second and third pairs of concentrically arranged opposing apertures 54 and 55 oriented orthogonally to said first pair. Each aperture describes an arc of 90°. Apertures 53 have a radius of $r_6$ for passing negative information light components from path $\alpha'_6$. Apertures 54 and 55 have radii of $r5$ and $r7$, respectively, for passing the positive information light components from paths $\alpha'_5$ and $\alpha'_7$.

Figure 8:
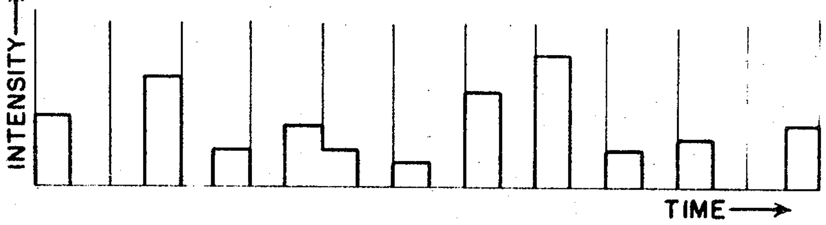
FIG. 8 is a graph employed in the description of the embodiment of FIG. 6.

In FIG. 8 is a graph showing the output obtained from photomultiplier 51. As in FIG. 5, the time periods correspond to the scanning of individual resolution elements by sampling filter 15b. If the operation of filter 50 is synchronized to that of filter 15b so that during each period sampling filter 50 rotates through 180°, two output pulse positions will exist for each period. Accordingly, pulses occurring in the first half of each period may indicate a product output of positive sign and pulses occurring in the second half of each period may indicate a product output of negative sign.

Figure 9:
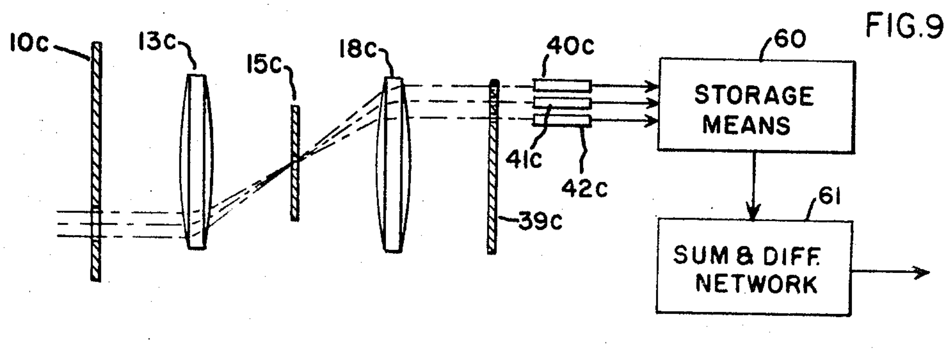
FIG. 9 is an optical schematic diagram of a third embodiment of the invention modifying the embodiment of FIG. 2 by the addition of storage and summing functions.

In the operation of the embodiments thus far considered there have been provided discrete product outputs. With slight modification, sums and differences of said products may be computed to provide integrated outputs with respect to a multiplicity of resolution element pairs. In FIG. 9 there is a modified embodiment of the system of FIG. 2, with similar optical components being similarly identified with a *c* subscript. Hence, filter 13*c* through photomultipliers 40*c*, 41*c* and 42*c* are shown, wherein the outputs from said photomultipliers are coupled to a storage means 60. The storage means may take a number of conventional forms, such as a magnetic drum having several tracks into which the product data is sequentially entered. There is further provided a summing and difference network 61 of conventional type, to which the stored data is coupled. One possible operation of network 61 may be to compute, for a given array of input data, the sums of all positive and all negative products, and then obtain the difference between said sums.

Figure 10:
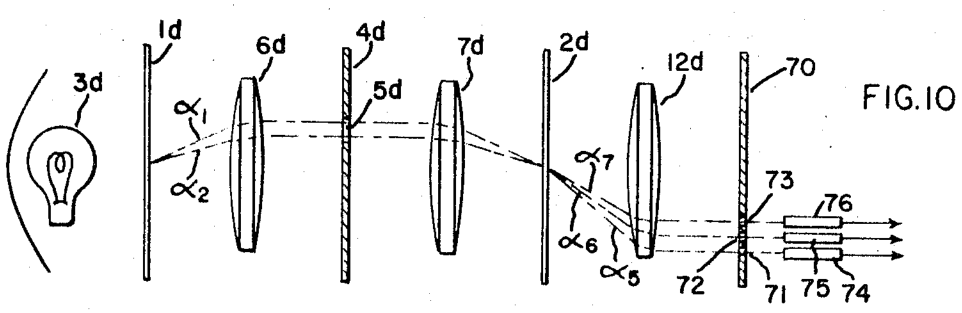
FIG. 10 is an optical schematic diagram of a fourth embodiment of the invention for obtaining an integrated output of processed coherent data.

With reference to FIG. 10, there is illustrated an optical schematic view of a further embodiment of the invention wherein integrated product outputs relating to a multiplicity of resolution element pairs are obtained directly from the optical energy. Components similar to those of FIG. 2 are similarly identified but with a *d* subscript. In lieu of the spatial filter 10 there is employed spatial filter 70 having three apertures 71, 72 and 73, for individually passing three positive first order light components representing the integrated processed data of positive and negative sign.

It will be recalled that although the light components for only a single pair of resolution elements are shown in the drawing, in fact all of the positive first order light components from the resolution elements of the first writing medium 1*d* pass through the aperture 5*d* of spatial filter 4*d*. Accordingly, the provided telecentric optics cause light components from each of the resolution elements to be directed along one of the two paths, corresponding to paths $\alpha_1$ and $\alpha_2$, and converge with like components within the aperture 5*d*. Similarly, all of the positive first order light components from medium 2*d* are directed along one of the three paths, corresponding to paths $\alpha_5$, $\alpha_6$ and $\alpha_7$, so as to converge with like components within the apertures 71, 72 and 73 of filter 70, the intensity of the combined light components transmitted through each of said apertures being proportional to the sum of the products contributing thereto. Accordingly, the light passing through aperture 71 corresponds to integrated products of inputs $\omega_1$; the light through aperture 72 corresponds to integrated products of inputs $\omega_1$ and $\omega_2$; and the light through aperture 73 corresponds to integrated products of inputs $\omega_2$. Photomultipliers 74, 75 and 76 receive light from apertures 71, 72 and 73, respectively, for providing electrical output signals, the magnitude of which is proportional to integrated product information of positive, negative and positive sign. The outputs of components 74 and 76 may be readily summed and that of component 75 subtracted for providing an overall integrated product.

Figure 11:
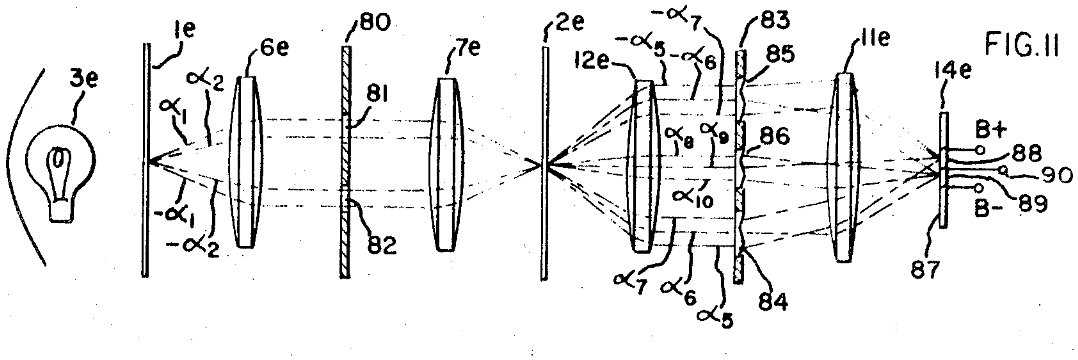
FIG. 11 is an optical schematic diagram of a fifth embodiment of the invention which obtains an integrated output similar to that of FIG. 10.

FIG. 11 shows an optical schematic view of a further modified embodiment of the invention for providing either discrete product or integrated product outputs wherein optical components similar to those previously considered are similarly identified with an *e* subscript. As in previous embodiments, light components for only a single pair of input resolution elements are illustrated. However, in the system of FIG. 11 both positive and negative first order light components are utilized. Thus, the first spatial filter 80 between lens elements 6*e* and 7*e* has a first aperture 81 for passing the positive first order components along paths $\alpha_1$ and $\alpha_2$, and a second aperture 82 for passing the negative first order components along paths $-\alpha_1$ and $-\alpha_2$. In lieu of the spatial filter 70 of the previous embodiment there is inserted filter 83 having a prism element 84 for intercepting the positive first order components along paths $\alpha_5$, $\alpha_6$ and $\alpha_7$, a similar prism element 85 for intercepting the negative first order components along path $-\alpha_5$, $-\alpha_6$ and $-\alpha_7$, and a further prism element 86 for intercepting first order components along paths $\alpha_8$, $\alpha_9$ and $\alpha_{10}$ which are a cross product of the positive and negative first order components. Prism elements 84, 85 and 86 have oblique planar surfaces which re-direct the positive information components, i.e., along paths $\alpha_5$, $\alpha_7$, $-\alpha_5$, $-\alpha_7$ and $\alpha_9$, and the negative information components, i.e., along paths $\alpha_6$, $-\alpha_6$, $\alpha_8$ and $\alpha_{10}$, so as to be focused at first and second points, respectively, with respect to each output resolution element in the output image plane 14*e*. As in previous embodiments, zero and higher than first order components are stopped by spatial filters 80 and 83.

At the output image plane 14*e* there is located a photoconductor array 87 having a pair of photosensitive members for each output resolution element. Only a single resolution element having photosensitive members 88 and 89 are illustrated in FIG. 11, positive information light components being focused upon member 88 and negative information light components being focused upon member 89. A source of positive potential B+ is connected to member 88 and a source of negative potential B− is connected to member 89. An output terminal 90 is connected at the junction of said photosensitive members whereby an output signal is obtained that is positive or negative in accordance with the incident light information.

Figure 12:
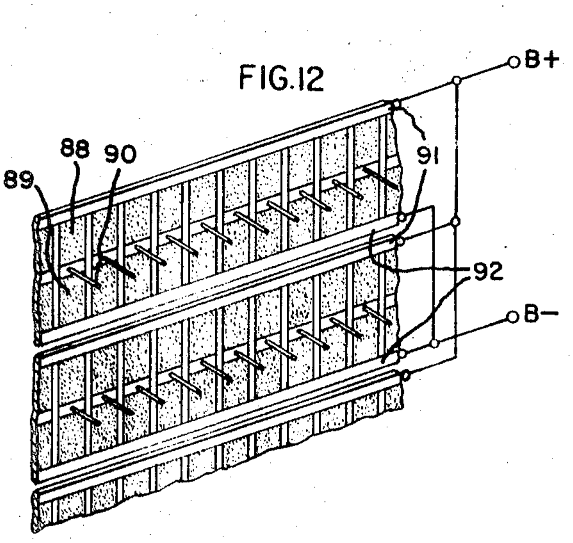
FIG. 12 is a perspective view of a portion of the output photosensitive structure employed in the embodiment of FIG. 11.

In FIG. 12 there is shown an enlarged perspective view of a portion of the photoconductor array 87. For purposes of illustration, only rows of several resolution elements each are included. Each row has a commonly connected positive contact 91 to which source B+ is applied, and a commonly connected negative contact 92 to which source B− is applied. Discrete product outputs may be obtained by individually coupling from the output terminals 90. Integrated product outputs may be obtained by providing a common connection to said output terminal 90.

The array may employ a photoconductor material, such as CdS, CdSe or Se, for the photosensitive members, being fabricated using thin film techniques.

Figure 13:
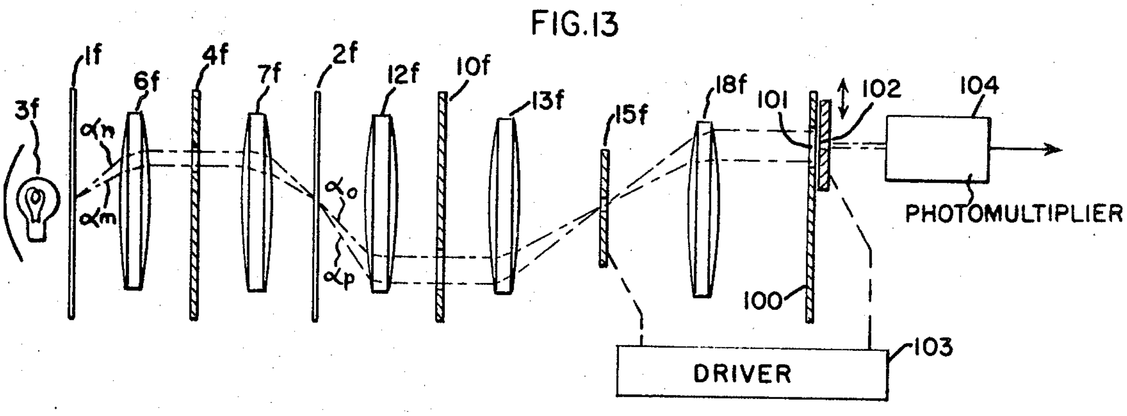
FIG. 13 is an optical schematic diagram of a sixth embodiment of the invention in which complex data containing a range of phase component values is processed to provide discrete outputs.

Referring to FIG. 13, there is illustrated an optical schematic diagram of an embodiment of the invention wherein a complex processing of data is provided with the phase information varied over a wide range of values. An *f* subscript is employed in FIG. 13 for identifying optical components similar to those previously considered. In the present system grating lines are entered on the writing media 1*f* and 2*f* with spatial frequencies $\omega_m$ through $\omega_n$, each spatial frequency representing different phase information. The illustrated light paths $\alpha_m$ and $\alpha_n$, corresponding to spatial frequencies $\omega_m$ and $\omega_n$, define the limits of the numerous discrete paths along which positive first order light components from medium 1*f* are directed, and paths $\alpha_o$ and $\alpha_p$ define the limits of light components from medium 2*f*.

The same optical principles for processing information as previously discussed apply to the system of FIG. 13, except that now a more complete spectrum of light components must be detected. Accordingly, light projected through each resolution element of medium 1*f* and through filter 6*f* is given an intensity and direction that is a function of the magnitude and phase of the applied data. Light projected through corresponding resolution elements of medium 2*f* and through filter 10*f* is given an intensity proportional to the product magnitudes of input pairs and a direction proportional to the phase of said products.

Figure 14:
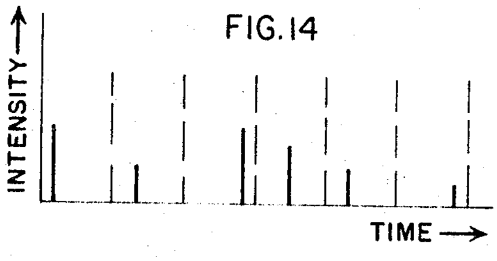
FIG. 14 is a graph employed in the description of FIG. 13.

Detection is accomplished by and output sampling filter 100 having a first large aperture 101 whose dimensions correspond to a single output resolution element and a second small aperture 102 having dimensions which correspond to the spatial line width of a single light component. Aperture 102 scans aperture 101 in a single direction and selectively passes the processed light components, said components being identified by the relative displacement of the aperture 102 from the optic axis. The movement of aperture 102 is synchronized to that of filter 15*f*, e.g., by a mechanical gear arrangement, schematically illustrated by block 103, so that during each period in which aperture 16*f* admits light components of a single output resolution element, aperture 102 scans through a complete cycle. A photomultiplier 104 is responsive to the light energy passed by aperture 102 for generating a train of narrow pulses, as shown in FIG. 14. The amplitude of each pulse is proportional to product magnitude and the relative position of each pulse within a single time period is proportional to product phase.

Figure 15:
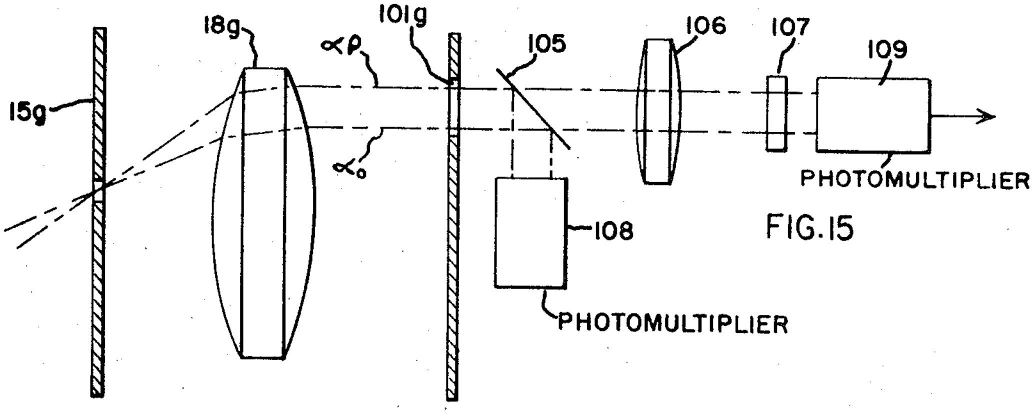
FIG. 15 is an optical schematic diagram of a seventh embodiment of the invention which performs a processing operation similar to that of FIG. 13.
Figure 16:
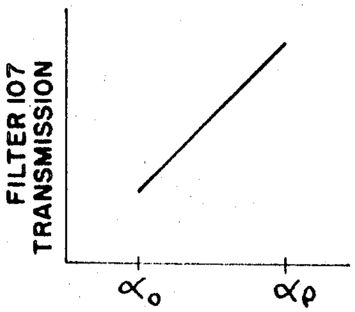
FIG. 16 is a graph of the transmission characteristics of the transmission filter in FIG. 15.

FIG. 15 illustrates a modified embodiment of the system of FIG. 13 wherein there is no requirement for mechanically scanning the aperture 101*g*, components similar to those of FIG. 13 being similarly identified with a *g* subscript. Accordingly, at the output side of filter 100*g* there is provided a beam splitter 105, a lens element 106, a variable transmission spatial filter 107 and a pair of photomultiplier components 108 and 109. Beam splitter 105 transmits half the incident energy from aperture 101 and reflects half. The entire reflected energy is received by first photomultiplier 108, which generates an output voltage $V_1$ proportional to the intensity of the received light. The transmitted energy is focused by lens 106 through filter 107 and received by second photomultiplier 109. The transmission characteristics of the filter 107 are illustrated in FIG. 16, from which it is seen that the filter passes light with an intensity that is a function of the light's spatial position. Photomultiplier 109 generates an output voltage $V_2$ proportional to both the spatial position of the light and its intensity. The ratio of $V_2/V_1$ is proportional to the light's spatial position independent of intensity. Accordingly, $V_1$ is a function of the product magnitude and $V_2/V_1$ is a function of the product phase.

In an alternative arrangement a photoconductor array comprising a single row of photosensitive members could be employed to sense the light energy transmitted through aperture 101*g*, said array being electrically scanned for intensity and position to obtain the output product information.

The appended claims are intended to include all modifications and variations of the embodiments herein disclosed which may reasonably be said to fall within the true scope of the invention.

What I claim as new and desire to secure by Letters Patent of the United States is:

1. An optical information processing system comprising:

a. a source of light energy having a predetermined minimum temporal coherence adequate to separate angularly coded diffracted components for directing light along the optic axis of said system, b. a first light modulating medium disposed along said axis including a plurality of resolution elements, each of which comprises magnitude and encoded phase components of first input data entered in the form of individual diffraction gratings, said gratings diffracting incident light with an intensity corresponding to the magnitude and at an angle to said optic axis corresponding to the phase of the input data encoded in each grating, c. a first spatial filter disposed along said axis in a spatial frequency plane for transmitting information-bearing light components from elements of said first medium restricted to a single diffraction order and embracing the diffraction angles into which said phase data is coded in elements of said first medium, d. a second light modulating medium disposed along said axis including a second plurality of resolution elements, each of which comprises magnitude and encoded phase components of a second input data entered in the form of individual diffraction gratings, said gratings diffracting incident light with an intensity corresponding to the magnitude and at an angle to said optic axis corresponding to the phase of the input data encoded in each grating, e. first means including said first spatial filter for imaging the filtered light components from elements of said first medium upon corresponding elements of said second medium with an intensity and incident angle corresponding, respectively, to the magnitude and encoded phase components of said first input data, f. a second spatial filter disposed along said axis in a spatial frequency plane for transmitting information-bearing light components from said second medium restricted to a single diffraction order and embracing diffraction angles corresponding to the sums of the first and second medium's diffraction angles, and g. output detection means upon which information-bearing light components transmitted by said second spatial filter impinge, displaced from said optic axis and in a spatial frequency plane, said output means having additional spatial selectivity for resolving and detecting individual diffraction angles of said impinging light components to obtain the sums of said successive diffraction angles for corresponding resolution elements in said two media and thereby obtaining product terms consistent with the rules of vector multiplication.

2. An optical information processing system as in claim 1 wherein said first means includes a pair of telecentric lens elements, said first spatial filter located in the spatial frequency plane existing between said lens elements.

3. An optical information processing system as in claim 2 which further includes:

a. a second pair of telecentric lens elements for imaging the filtered light components from said second medium as a plurality of output resolution elements at an output image plane, said second spatial filter located in the spatial frequency plane existing between said second pair of lens elements, b. a sampling spatial filter positioned in said output image plane for sequentially passing the light components of each output resolution element, c. a further telecentric lens element forming a third spatial frequency plane for light components passed by said sampling spatial filter, d. wherein said additional spatial selectivity of said output detection means is provided by a spatial filter located in said third spatial frequency plane; and e. wherein said output detection means includes photosensitive means for receiving light components passed by said output spatial filter for providing discrete product outputs.

4. An optical information processing system as in claim 3 wherein said diffraction grating lines have one of two distinct spatial frequencies representing positive and negative polarity of the input data.

5. An optical information processing system as in claim 4 wherein said first and second light modulating media have a deformable writing surface upon which said grating lines are impressed.

6. An optical information processing system as in claim 4 wherein said output spatial filter includes a plurality of fixed apertures each passing light components representing discrete products of a distinct phase, and said photosensitive means includes a photodetector for each aperture.

7. An optical information processing system as in claim 4 wherein said output spatial filter includes a plurality of rotating apertures each passing light components representing discrete products of a distinct phase, and said photosensitive means includes a single photodetector for all apertures.

8. An optical information processing system as in claim 2 which includes:

a. a second pair of telecentric lens elements for imaging the filtered light components from said second medium as a plurality of output resolution elements at an output image plane, said second spatial filter located in the spatial frequency plane existing between said second pair of lens elements, b. said second spatial filter including multi-surface prism means for modifying the imaging operation of said second pair of telecentric lens elements so that for each output resolution element the light components from said second medium are impinged at spaced apart points by deflection at an angle to said optic axis corresponding to the phase information carried thereby, and c. wherein said output detection means includes photosensitive means in said output image plane responsive to said light components of equal phase information.

9. An optical information processing system as in claim 8 wherein said photosensitive means includes an array of photoconductor members.

10. An optical information processing system as in claim 2 which includes:

a. a further telecentric lens element forming a second spatial frequency plane in which is located said second spatial filter, and b. wherein said output detection means includes photosensitive means for receiving light components passed by said second spatial filter for providing an integrated product output.

11. An optical information processing system as in claim 10 wherein said diffraction grating lines have one of two distinct spatial frequencies representing positive and negative polarity of the input data.

12. An optical information processing system as in claim 11 wherein said first and second light modulating media have a deformable writing surface upon which said grating lines are impressed.

13. An optical information processing system as in claim 11 wherein said second spatial filter includes a plurality of fixed apertures each passing light components representing integrated products of a distinct phase, and said photosensitive means includes a photodetector for each aperture.

14. An optical information processing system as in claim 3 wherein said diffraction grating lines have one of numerous distinct spatial frequencies representing a range of phase information of the input data.

15. An optical information processing system as in claim 14 wherein said first and second light modulating media have a deformable writing surface upon which said grating lines are impressed.

16. An optical information processing system as in claim 14 wherein said output spatial filter includes a first fixed aperture for passing essentially all light components from said sampling spatial filter and a second smaller dimensioned aperture which is scanned over said first aperture for passing light components representing discrete products of a distinct phase.

17. An optical information processing system as in claim 14 wherein said output spatial filter includes a fixed aperture for passing essentially all light components from said sampling spatial filter and wherein the output detection means includes:

a. a beam splitting element for dividing into two channels the light passed through said fixed aperture, b. a variable transmission filter placed in one of said channels for transmitting light with an intensity that is a function of spatial position, c. said photosensitive means including a first photodetector for receiving the light in the other of said channels and a second photodetector for receiving the filtered light in said one channel, the outputs of said first and second photodetectors being $V_1$ and $V_2$, respectively, where $V_1$ provides a measure of product magnitude and $V_2/V_1$ provides a measure of product phase.

* * * * *